July 15, 1969     T. E. GREENWOOD ET AL     3,455,349
FLUID FILTERS AND APPARATUS FOR BLEEDING HYDRAULIC SYSTEMS
Filed Dec. 15, 1965     2 Sheets-Sheet 1
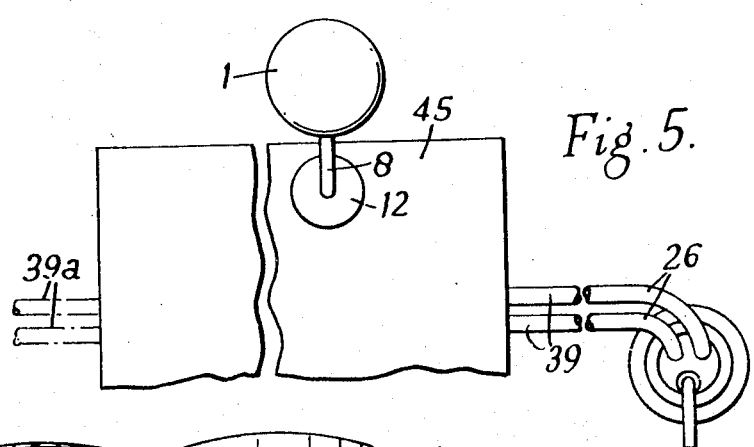
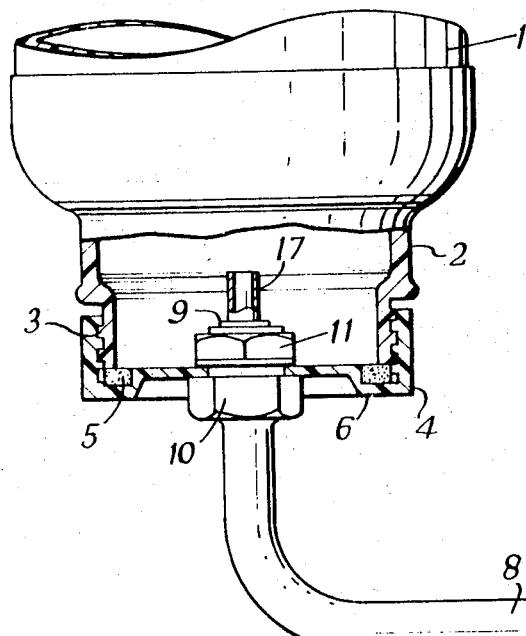
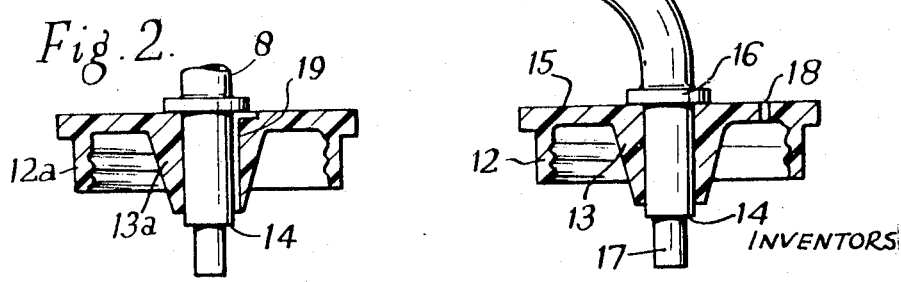
INVENTORS
THOMAS ERIC GREENWOOD
DENIS FREDERICK WOOR AND
RONALD EDWARD FARNFIELD
By Mason, Kolehmainen, Rathburn & Wyss
ATTORNEYS

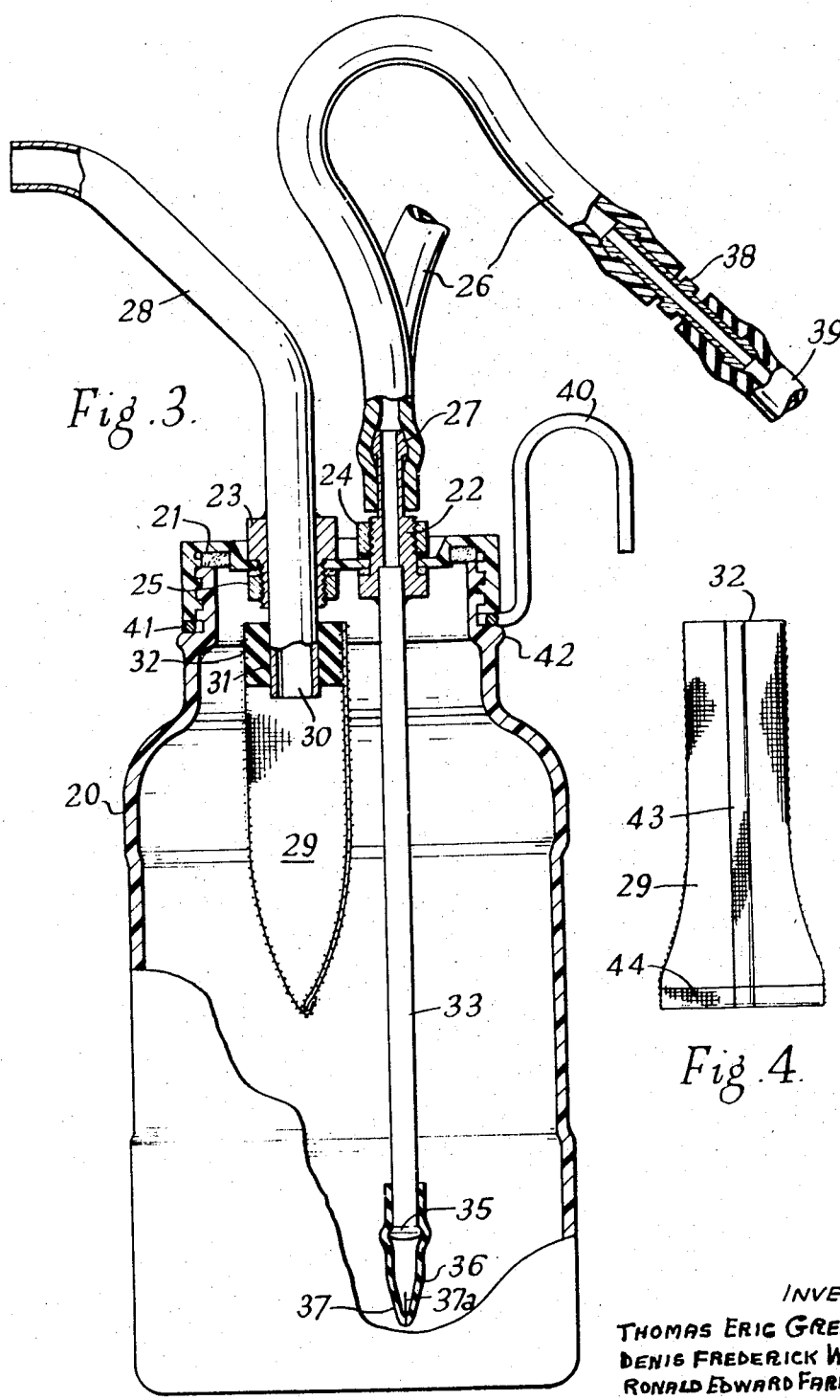

United States Patent Office 3,455,349
Patented July 15, 1969

3,455,349
FLUID FILTERS AND APPARATUS FOR BLEEDING HYDRAULIC SYSTEMS
Thomas Eric Greenwood, Denis Frederick Woor, and Ronald Edward Farnfield, Plymouth, Devon, England, assignors to Tecalemit (Engineering) Limited, Plymouth, Devon, England
Filed Dec. 15, 1965, Ser. No. 513,930
Claims priority, application Great Britain, Dec. 14, 1964, 50,903/64
Int. Cl. B65b 1/04; B67c 3/00
U.S. Cl. 141—325                                7 Claims

ABSTRACT OF THE DISCLOSURE

There is provided an apparatus for bleeding a hydraulic fluid system. An auxiliary reservoir contains liquid to be introduced into the system and is connected to the system through a vented plug. A pipe is contained in the cranked pipe which connects the system to the reservoir. As the liquid in the system is bled into the drainage reservoir by operation of the brake pedal liquid passes down the pipe from the reservoir and is replaced therein by air flowing in the space between the two pipes. When the drainage reservoir is full or when the bleeding is completed the liquid can be discharged through an outlet in this reservoir which may be made of deformable material to allow contraction of the reservoir volume by hand operation. The inlet to the drainage reservoir contains a non-return valve.

This invention relates primarily to the bleeding of hydraulic fluid systems and it is more particularly, but not exclusively, concerned with apparatus for bleeding air from hydraulic brake systems.

The invention is also concerned with improvements in parts of such apparatus and, in one of its aspects, it provides a fluid filter which, although it is particularly designed for inclusion in the air bleeding apparatus of the invention, is also suitable for other uses.

According to the invention, in one of the aspects thereof, apparatus is provided for use in bleeding a hydraulic fluid system, comprising a drainage reservoir which is adapted to receive fluid bled from the system and which includes at least one inlet connection for connecting the reservoir to a bleed outlet in the system, a non-return valve to prevent the flow of fluid from the reservoir back through the inlet into the system, an outlet for the discharge of hydraulic fluid which has been collected in the reservoir and a filter for filtering fluid discharged from the reservoir through this outlet.

The invention further provides apparatus for use in bleeding a hydraulic fluid system comprising an auxiliary reservoir which is adapted to contain a supply of the hydraulic fluid and which includes fluid outlet and air return pipes and a connecting cap for connecting these pipes to the fluid system, wherein the said pipes are arranged concentrically one within the other and the cap has an air inlet such that hydraulic fluid can flow through the inner pipe from the auxiliary reservoir to the system while air is admitted to the auxiliary reservoir through the space between the pipes so long as the end of the outer pipe is not covered by hydraulic fluid in the system.

The above apparatus including the drainage reservoir and the auxiliary reservoir, with their associated parts, are intended to be used together and the provision and the use of an assembly including them for the bleeding of hydraulic fluid systems constitute further useful features of this invention.

The invention further provides a fluid filter comprising a tubular casing formed of metal gauze, one end of which casing is closed and the other end of which is provided with a connection for the flow of the fluid being filtered.

As has been said the above filter is particularly suitable for inclusion in the drainage reservoir but it is suitable for other applications and uses.

The invention also provides further improvements in the apparatus referred to above and parts thereof.

For the better understanding of the invention, in its various aspects, and methods of carrying it out reference may be made to the following description taken in conjunction with the accompanying drawings.

In the drawings:

FIGURE 1 is a side elevation, partly in section, showing part of one form of apparatus which is intended for bleeding the hydraulic brake system of a motor vehicle;

FIGURE 2 shows in axial section a detail modification of the apparatus shown in FIGURE 1;

FIGURE 3 is a sectional elevation showing another part of the brake-bleeding apparatus;

FIGURE 4 is an end view of a detail of the apparatus shown in FIGURE 3;

FIGURE 5 is a highly diagrammatic view showing how the apparatus of the invention can be connected to the oil reservoir of a hydraulic brake system.

Referring to FIGURE 1, this shows an auxiliary reservoir 1 which is in the form of a translucent squeeze bottle made of a synthetic plastics material. This bottle 1 has a wide neck 2 which is externally threaded at 3 to receive an internally threaded cap 4 made of a moulded synthetic plastics material.

A sealing ring 5 of natural or synthetic rubber or other elastomeric material is provided on the inside of the part 6 of the cap 4 and provides a seal between the cap and the neck of the bottle.

The bottle 1 is provided with an outlet consisting of a cranked pipe 8, which is made of metal. This pipe 8 is provided at its upper end 9 with a threaded adaptor 10 which passes through a central aperture in the cap 4 and which is externally threaded to receive a locking nut 11.

A further cap 12, which may also be made of a moulded synthetic plastics material, has an internal boss 13 which is bored to receive the lower end 14 of the pipe 8. The top 15 of the cap 12 abuts against a shoulder 16 on the pipe 8.

A tube 17 which is made of a synthetic plastics material, such as nylon, is fitted within the pipe 8 and projects from it at the upper and lower ends 9 and 14, respectively, of the pipe 8. The tube 17 fits loosely within the pipe 8 but its deformation within this cranked pipe is sufficient to retain the tube 17 in position within the pipe 8 under normal conditions.

The cap 12 may be made in a variety of standard sizes to fit the various known sizes of the inlets to the hydraulic fluid reservoirs incorporated in the hydraulic brake systems of current vehicles. However, additional sizes may be added to this range to provide for possible future inlets with different dimensions.

An air vent 18 is provided in the top 15 of the cap 12 shown in FIGURE 1. However, in the case of the smaller sizes of cap, it may be inconvenient to provide a vent such as that shown at 18. In such cases the modified construction shown in FIGURE 2 may be employed. In this modified construction, a groove 19 is formed on the inside wall of the central boss, here shown at 13a, to provide a vent channel when the lower end 14 of the pipe 8 is inserted into the cap which is here indicated at 12a.

The part of the apparatus which is shown in FIGURE 3 includes a drainage reservoir which, like the auxiliary reservoir 1 of FIGURE 1, is in the form of a squeeze-bottle 20 made of a translucent deformable synthetic plastics material. For convenience, the bottles 1 and 20 may be identical.

Considerable advantage may be gained by making the bottles 1 and 20 of the same size, since the level of the hydraulic fluid rising in the drainage reservoir 20, when the latter approaches the condition in which it is full, will then indicate that the level of the fluid in the auxiliary reservoir 1 is nearing the condition in which it is empty.

The cap 21 of the bottle 20, which cap may also be made of a moulded synthetic plastics material, is bored to receive a pair (or any other desired number) of inlet adaptors 22, which are arranged side by side (only one being visible), and an outlet adaptor 23. The adaptors 22 are externally threaded to receive locking nuts 24, whilst the adaptors 23 is also threaded to receive a nut 25.

A pair of transparent inlet tubes 26 made of a synthetic plastics material are connected to outwardly projecting shanks 27 on the adaptors 22.

An outlet pipe 28 passes through a central bore in the adaptor 23 and is welded or otherwise secured to this adaptor. A metal gauze filter 29, whose construction will be described in greater detail, is secured to the lower end 30 of the outlet pipe 28 by means of a rubber ring 31 which is received within the mouth 32 of the filter 29. The dimensions of the ring 31 are such that the ring normally fits loosely within the mouth 32 until the end 30 of the pipe 28 is inserted into the central bore of the ring, whereupon the ring forms a tight fit with the mouth 32 of the filter 29.

FIGURE 4 shows the structure of the filter 29 in greater detail. This filter is in the form of a tube made of metal gauze which has a side seam 43 and also an end seam 44 at the lower end of the filter. This filter 29 may be formed by bringing together two opposing side edges of a sheet or strip of metal gauze to form a cylindrical tube, so that the two edge-portions overlap one another. The part constituted by these edge-portions is folded upon itself to form the seam 43, which may be crimped if desired to assist in maintaining the shape of the filter.

One end of the tubular unit resulting from this first step is now flattened to bring opposite wall-portions into contact with one another, and the part formed by the contacting edge-portions at this end of the tube is then folded upon itself to form the end seam 44, which again may be crimped if desired. The other, undeformed, end of the tube constitutes the mouth 32 of the filter.

The metal gauze filter shown in FIGURES 3 and 4 constitutes a simple and inexpensive coarse filter which is effective for this as well as for other purposes.

Its effectiveness as a filter, e.g. for retaining fine solid particles which would normally pass through the holes in the material of the filter, may be increased by including an additional filter material as a filling within the filter 29. Various materials may be used for this purpose, including particularly natural or synthetic filamentary or fibrous materials. A preferred filling is one which is formed of an intermingled coherent mass of fibres made from a copolymer of an acrylonitrile and a vinyl chloride.

A metal extension tube 33 is soldered or brazed into each adaptor 22 so as to extend vertically downwardly within the bottle 20 to a position near the bottom of the bottle. The lower end 35 of the tube 33 is swagged to receive a non-return valve 36.

This valve 36 consists of a short tube made of a synthetic plastics material which is closed at its lower end 37; it may be formed by dip moulding. A thin cut 37a is then formed in this end 37, e.g. a razor cut, to define lips which move apart when subjected to fluid pressure from within the valve 36 but which close together again when the pressure within the valve no longer exceeds that outside or when the pressure outside is greater.

A connector 38 of conventional type connects each of the tubes 26 to a further tube 39 made of rubber or other flexible material.

A hook member 40 is provided for suspending the drainage reservoir 20 when necessary. This has a ring part 41 which is held between a shoulder 42 on the neck of the bottle 20 and the cap 21. The hook member 40 forms a conventional means for supporting the drain bottle.

The operation of the brake bleeding apparatus which is the auxiliary reservoir shown in FIGURE 1 and the drainage reservoir of FIGURE 3 will now be described with particular reference to FIGURE 5.

The existing cap on the reservoir 45 of a hydraulic brake system is removed and replaced by an adaptor cap 12 which is chosen from the range of standard sizes available to fit the inlet of the particular reservoir 45 in question. The cap 4 (FIGURE 1) with the attached pipe 8 and tube 17 are removed from the squeeze-bottle 1, which filled with the appropriate hydraulic liquid whilst it is in its upright position, as opposed to the inverted operating position shown in FIGURE 1.

The bottle 1 is then inverted, as shown in FIGURE 1 and the lower end 14 of the pipe 8 is inserted into the boss 13 of the cap 12, which latter is in position in the inlet of the reservoir 45. The cranked shape of the pipe 8 allows the auxiliary reservoir 1 to be brought sufficiently close to the reservoir 45 for this purpose, without its fouling, for example, the bodywork of a vehicle carrying the reservoir 45, or other adjacent components.

If the hydraulic fluid in the reservoir 45 is below the end 14 of the pipe 8, air enters via the vent 18 (or the groove 19 of FIGURE 2), passes through the annular space between the pipe 8 and the internal tube 17 and enters the auxiliary reservoir 1. The brake fluid then enters the reservoir 45 from the bottle 1 until the lower end 14 of the pipe 8 is covered. This level of brake fluid in the system will be maintained until the bottle 1 is empty. The contents of the latter would have to be replaced if the brake-bleeding operations have not been completed at this stage.

The vehicle containing the reservoir 45 has a pair of front bleed screws (not shown) and a pair of rear bleed screws (also not shown). After, for example, partially unscrewing the front bleed screws, the pipes 39 constituting the inlets of the drainage bottle 20 are connected to these bleed points. If the vehicle brake pedal is now depressed, the brake fluid will be ejected through the pipes 39 and 26 into the bottle 20. Any air expelled from the vehicle hydraulic system will be visible as the hydraulic fluid passes through the transparent tubes 26; pumping is continued until a clear flow is seen.

The same procedure is followed in connection with the rear bleed screws the connections to which are indicated purely diagrammatically at 39a in FIGURE 5.

Since the fluid enters the drainage bottle 20 through the non-return valves 36, it cannot be drawn back into the hydraulic system when the brake pedal is released.

The drainage bottle 20 can be emptied into a suitable container through its outlet pipe 28 by inverting the bottle 20 and squeezing it. The non-return valves 36 again prevent the fluid from passing back into the extension tubes 33. Thus the fluid passes through the filter 29 and the pipe 28 into the container used, which is not shown. This ensures that any foreign matter ejected from the vehicle brake system is retained in the drainage bottle 20.

The depression of the brake pedal to ensure the bleeding of the hydraulic system of the brake may be effected by means of the apparatus described and claimed in the specification of our United Kingdom applications. The necessary operations may be carried out by a single operator using this apparatus and, accordingly, the combination of this apparatus with the brake-bleeding apparatus which has just been described leads to a completely closed system requiring the attention of only one operator. Furthermore, the particular brake-bleeding apparatus of the present invention prevents the introduction of air into the hydraulic system, such as would occur if the apparatus described in our applications 31,020/64 and 22,743/65 were used with conventional brake-bleeding apparatus. The effect of the auxiliary reservoir is to keep the reservoir of the hydraulic brake system continually topped up so that any introductions of air into the system are avoided.

Although the bleeding apparatus of the present invention has been described with particular reference to its use in the bleeding of a hydraulic brake system, it may be employed successfully in the bleeding of other hydraulic fluid systems and it is not limited to use with brake systems or to motor vehicles.

Furthermore the filter which has been described is suitable for many other applications and uses. It is not restricted to use as an oil filter but it may be used with other fluids, both gaseous and liquid. This applies particularly to the filter with a fibrous or filamental filling which has been described and which has a general application as a filter, especially as a throw-away filter, which is extremely simple and inexpensive to manufacture.

We claim:

1. An apparatus for use in bleeding a hydraulic fluid system comprising:

an auxiliary reservoir having a fluid outlet pipe and an air return pipe and a connected cap for connecting these pipes to the fluid system, the pipes being arranged with the fluid outlet pipe within the air return pipe with a space between them and the cap having an air inlet so that hydraulic fluid can flow through the inner pipe from the auxiliary reservoir to the system while air is admitted to the auxiliary reservoir through the space between the pipes so long as the end of the air return pipe is not covered by hydraulic fluid in the system; and a drainage reservoir for receiving fluid bleed from the system and which includes at least one inlet connection for connecting the reservoir to a bleed outlet in the system, a non-return valve to prevent the flow of liquid from the drainage reservoir into the system and an outlet for the discharge of hydraulic fluid which has been collected in the drainage reservoir.

2. Apparatus according to claim 1 wherein the body of the drainage reservoir is formed of a resiliently deformable synthetic plastics material.

3. Apparatus according to claim 1 wherein the drainage reservoir has at least two connections for connection to bleed outlets in the system, each of which is provided with a non-return valve.

4. Apparatus according to claim 1 wherein the outer pipe is formed of metal and bent into a generally cranked shape and the inner pipe is made of a flexible synthetic plastics material.

5. Apparatus according to claim 1 in which the non-return valve is formed of an elastomeric material and is of general form having one end which is fitted into a tube forming part of the inlet connection and the other end has one slit through which liquid from the system enters the reservoir.

6. Apparatus according to claim 1, wherein a filter is included in the fluid outlet in the drainage reservoir.

7. An apparatus as claimed in claim 1 wherein the inlet connection to the drainage reservoir has a transparent part for viewing the liquid passing into the reservoir.

References Cited

UNITED STATES PATENTS

| | | | |
|---|---|---|---|
| 1,262,495 | 4/1918 | Hills | 210—315 |
| 1,835,429 | 12/1931 | Rice et al. | 210—499 X |
| 2,186,987 | 1/1940 | Nesset | 210—448 X |
| 2,355,822 | 8/1944 | Rugeley | 210—505 X |
| 2,731,027 | 1/1956 | Dawn | 137—525.1 X |
| 2,735,601 | 2/1956 | Barrett | 141—285 |
| 2,761,833 | 9/1956 | Ward | 210—136 X |
| 2,777,293 | 1/1957 | Hawkins | 188—152.10 X |
| 3,246,767 | 4/1966 | Pall et al. | 210—505 |

FOREIGN PATENTS 868,149   5/1961   Great Britain.

OTHER REFERENCES

Miller Tool and Manufacturing Co. (Circular), Detroit, Mich., "Brake Master Cylinder Automatic Refiller," pp. 19.

WILLIAM F. O'DEA, Primary Examiner

DAVID R. MATTHEWS, Assistant Examiner

U.S. Cl. X.R.

137—453; 188—152; 210—136, 444